No. 766,310. PATENTED AUG. 2, 1904.
G. WINTER, F. EICHBERG & J. ALEXANDER.
CONTROL OF ALTERNATING CURRENT MOTORS.
APPLICATION FILED NOV. 16, 1903.
NO MODEL. 3 SHEETS—SHEET 3.

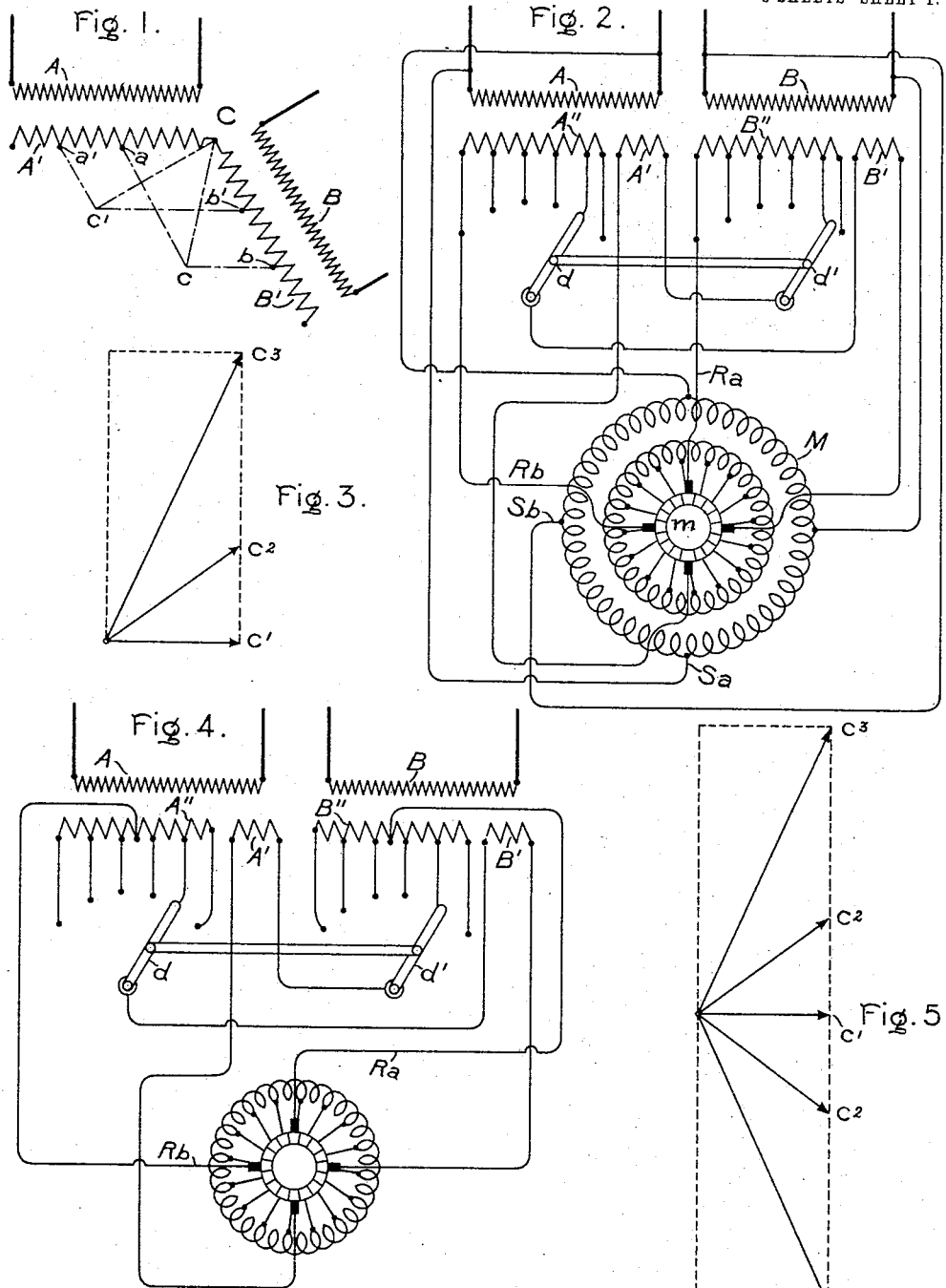

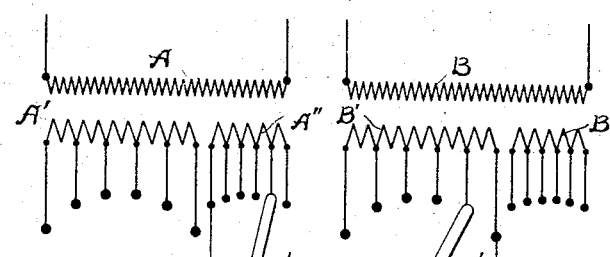
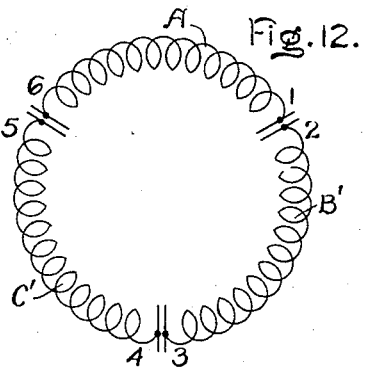
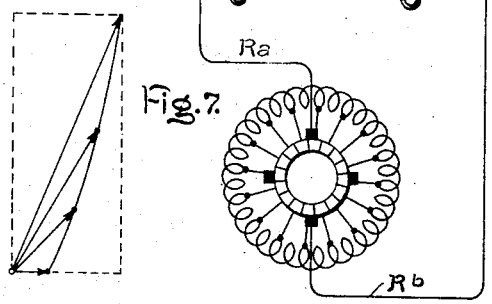
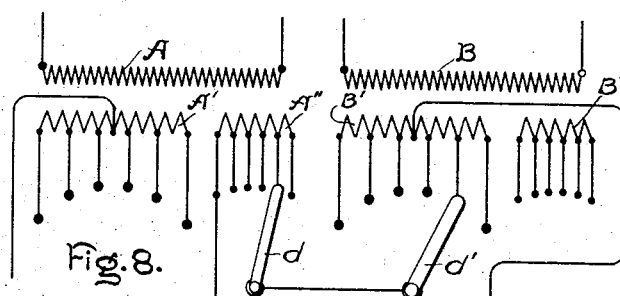
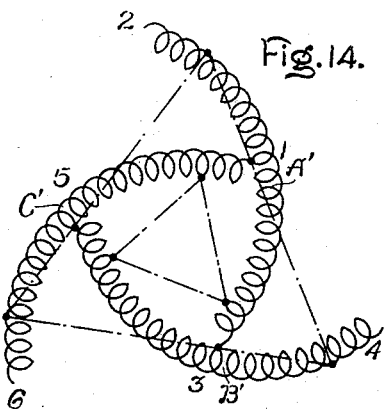
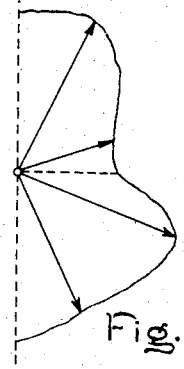
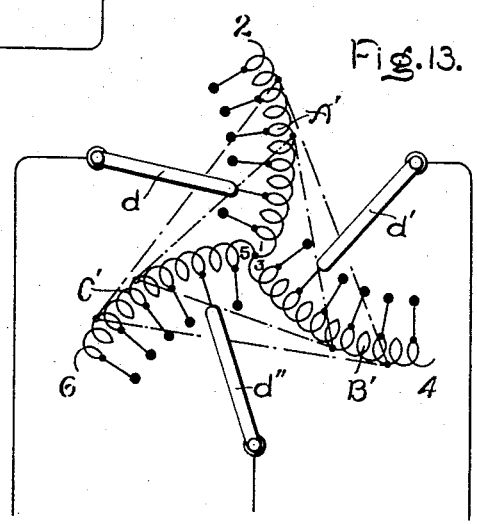

Witnesses:
Harry H. Tilden
Helen Oxford

Inventors:
Gabriel Winter,
Friedrich Eichberg,
Johann Alexander,
by Albert G. Davis Att'y.

No. 766,310.

Patented August 2, 1904.

UNITED STATES PATENT OFFICE.

GABRIEL WINTER, OF VIENNA, AUSTRIA-HUNGARY, AND FRIEDRICH EICHBERG AND JOHANN ALEXANDER, OF BERLIN, GERMANY, ASSIGNORS TO GENERAL ELECTRIC COMPANY, A CORPORATION OF NEW YORK.

CONTROL OF ALTERNATING-CURRENT MOTORS.

SPECIFICATION forming part of Letters Patent No. 766,310, dated August 2, 1904.

Application filed November 16, 1903. Serial No. 181,331. (No model.)

*To all whom it may concern:*

Be it known that we, GABRIEL WINTER, a subject of the Emperor of Austria-Hungary, and a resident of Vienna, in the Empire of Austria-Hungary, and FRIEDRICH EICHBERG, a subject of the Emperor of Austria-Hungary, and JOHANN ALEXANDER, a subject of the Emperor of Germany, both residents of Berlin, in the Empire of Germany, have invented certain new and useful Improvements in the Control of Alternating-Current Motors, of which the following is a specification.

Our invention relates to the control of alternating-current motors, and especially to that class of motors in which both stationary and rotating members are supplied with alternating current. In motors of this class the rotating member is equipped with a commutator similar to that employed in direct-current machines and current is supplied to the rotating member through brushes bearing on the commutator. In machines of this type the speed may be varied by varying the voltage impressed upon one or both of the members of the motor; but simultaneously with the variation in voltage a change occurs in the phase relation of the currents in the two members. This change in phase may be compensated for by shifting the position of the brushes around the commutator; but such a shifting of the brushes is objectionable; and it is the object of our invention to provide means for simultaneously regulating the speed and compensating for phase changes without changing the position of the circuit connections to either member of the motor.

In carrying our invention into effect we provide, in connection with a motor of the character above specified, means for simultaneously varying the voltage and phase of the current supplied to the motor in such a manner as to obtain satisfactory conditions of running at all speeds.

Referring to the drawings, Figure 1 shows diagrammatically the general method of varying voltage and phase simultaneously. Fig. 2 shows an arrangement of circuit adapted to the control of a two-phase motor in accordance with our invention. Fig. 3 shows diagrammatically the resultant voltages and their phases obtained by the arrangement of Fig. 2. Figs. 4 and 5 show modifications of the same. Figs. 6, 7, 8, and 9 show further modifications. Fig. 10 shows an arrangement of circuits adapted to a three-phase motor. Fig. 11 shows a reversing-switch which may be used with our invention. Figs. 12, 13, and 14 show diagramatically a rotary field-transformer adapted to our invention.

In Fig. 1, A and B represent the primaries of two transformers supplied with currents the phase difference of which is indicated by the angle between the windings A and B. A' and B' represent the secondaries of the transformers. If the secondaries A' and B' are connected at C, it is evident that the voltage between any two points, such as $a$ and $b$, will be represented in magnitude and phase by the line C $c$. In like manner the voltage between any two points, such as $a'$ $b'$, will be represented in magnitude by C $c'$.

Referring now to Fig. 2, M represents a motor bearing on its stationary member a two-phase winding $S^a$ and $S^b$. The rotor, which is provided with a commutator $m$, has also a two-phase winding $R^a$ and $R^b$. The stator-windings are supplied directly from the mains, as indicated in the drawings. The rotor-windings are supplied through the secondary windings of the transformers A B. One part, A', of transformer A is connected in series with a variable part B'' of transformer B. The rotor-winding $R^a$ is connected in series with these two secondary windings. Rotor-winding $R^b$ is likewise connected in series with secondary winding B' and variable secondary winding A''. The effective turns of windings A'' and B'' are varied by means of the switches $d$ $d'$, which are mechanically connected so as to be operated simultaneously. The resultant voltages for different positions of switches $d$ $d'$ are shown in Fig. 3. If $c'$ represents in phase and magnitude the voltage applied to one of the phases of the rotor-winding when all the variable secondary windings are cut out of circuit, then $c^3$ will represent the corresponding voltage when all the variable secondary windings are cut in and $c^2$ will represent the voltage corresponding to an intermediate position of the switch. It is evident that by a proper proportioning of the variable secondary winding to the winding in series with it the voltage and phase may be varied simultaneously in a predetermined ratio. The transformer-windings are so connected that when the switches $d$ $d'$ are moved simultaneously the resultant voltages in the two rotor-circuits will always be displaced in phase from one another by an angle of ninety degrees.

Fig. 4 shows a diagram of transformer connections by means of which the phases of the electromotive forces may be reversed as well as varied. In this figure the stator-winding is omitted for the sake of simplicity. It will be noticed that in this arrangement one terminal of each of the rotor-windings is connected to the middle point of one of the variable secondary windings. As the switches $d$ $d'$ pass the middle point of the variable secondary windings the voltage components furnished by these windings will reverse in direction.

Fig. 5 shows the variations in the resultant voltages which may be obtained by means of this arrangement.

Fig. 6 shows an arrangement in which both parts of both secondary windings are variable. Only one rotor-winding is shown, the other being omitted for the sake of simplicity. By this arrangement the voltage may be made to vary along a curve, as shown in Fig. 7.

Fig. 8 shows an arrangement in which both parts of both secondary windings are variable and arranged to furnish reversible voltage components. By this arrangement the voltage may be made to vary along a curve of any shape, as shown in Fig. 9.

Figure 10:
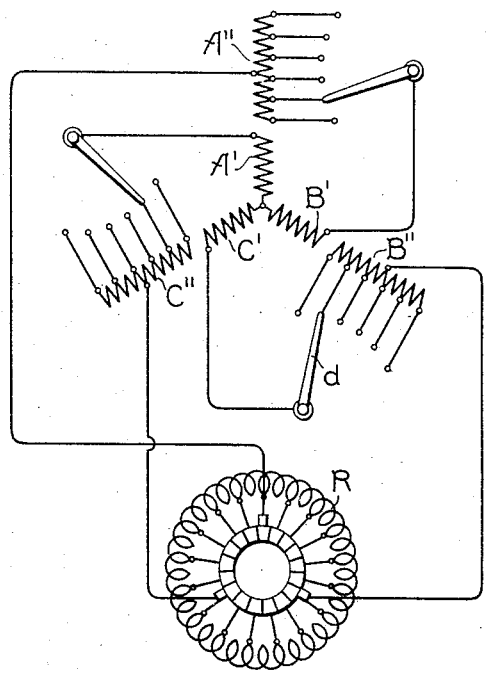
Fig. 10 shows an arrangement adapted to a motor with a three-phase winding. This arrangement is so similar to that of the two-phase already described as to require no further explanation.
Figure 11:
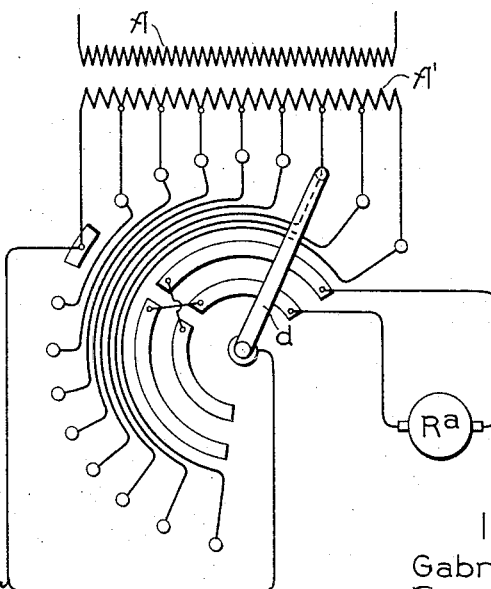

Fig. 11 shows a reversing-switch that may be used in place of the connection to the middle of the variable secondary transformer-winding. It is evident from the drawings that as the switch passes from one set of contacts to the other the voltage supplied by the variable secondary transformer-winding is reversed. This arrangement requires only half as many turns in the transformer-winding which furnishes the reversible voltage as the arrangements of Figs. 4 and 8. In Fig. 11 the circuit from the secondary winding $A'$ is shown as connected directly to the rotor-winding; but it will be understood that a secondary winding of the other phase is to be connected in series with the winding $A'$, the same as in the other figures of the drawings.

Instead of using separate transformers for the currents of the different phases simultaneous variation of voltage and phase may be obtained from a single transformer of the rotary field type.

If the winding of such a transformer as shown diagrammatically in Fig. 12 be connected as shown in Fig. 13, both the magnitude and phase of the voltages obtained therefrom will be varied as the switches are moved. The dotted triangles in Fig. 13 show the magnitude and phase of the voltages for two positions of the switches, these switches being mechanically interlocked, so as to move simultaneously.

Fig. 14 shows a modification of Fig. 13, the three windings being connected differently. The dotted triangles show the magnitude and phase relations of two sets of voltages obtained by this arrangement. It will be evident that the relative variation of phase and voltage is different in this case from that in Fig. 13. Thus by changing the connections of such a winding the relative relations of voltage, magnitude, and phase may be varied.

Although we have shown our invention applied to a particular type of alternating-current motor—namely, a motor with a Gramme winding on both members and with the varying voltage supplied to the rotor—nevertheless it is obvious that our invention is not limited to this particular type of machine.

Our invention may be used with a machine having any well-known type of winding on stator or rotor adapted to alternating currents of any number of phases, and the varying voltages may be supplied to either stator or rotor, or both. Furthermore, our invention is applicable to such machines whether operating as motors or when mechanically driven as generators. Accordingly we do not desire to limit ourselves to the particular construction and arrangement of parts here shown, since changes therein which do not depart from the spirit of our invention and which are within the scope of the appended claims will be obvious to those skilled in the art.

Having thus fully described our invention, we claim as new and desire to protect by Letters Patent of the United States—

1. In combination, an alternating-current machine, means for supplying alternating current to both members of said machine, and means adapted to vary simultaneously the voltage and phase of the current supplied to one member.

2. In combination, an alternating-current machine, means for supplying alternating current to both members of said machine, and a switch in the circuit of one member adapted to vary simultaneously the voltage and phase of the current supplied thereto.

3. In combination, an alternating-current machine, means for supplying alternating current to both members of said machine, and a switch adapted to vary simultaneously the voltage and phase of the current supplied to one member relative to that supplied to the other member.

4. In combination, an alternating-current motor of the commutator type, and means for supplying to one member of said motor current varying simultaneously in voltage and phase.

5. In combination, a main polyphase circuit, a secondary polyphase circuit derived therefrom, a switch adapted to connect in varying proportions the phases of said secondary circuit, and an alternating-current motor having one member supplied with current from the main circuit and the other member from the secondary circuit.

6. In combination, an alternating-current machine, sources of polyphase voltages, and a switch adapted to combine in varying proportions voltages from said sources and to impress the resultant voltages on one member of said machine.

7. In combination, an alternating-current motor of the commutator type, sources of polyphase voltages, and a switch adapted to combine varying component voltages from said sources and to impress the resultant on one member of said motor.

8. In combination, an alternating-current motor, transformer-windings excited to produce voltages of different phase, contacts connected to points on said windings, and a switch coacting with said contacts adapted to combine varying parts of said windings and to impress the resultant voltages on one member of said motor.

9. In combination, an alternating-current motor, transformer-windings excited to produce voltages of different phase, contacts connected to points on said windings, and a switch connected to one member of said motor and adapted to coact with said contacts so as to impress on said member currents varying simultaneously in voltage and phase.

10. In combination, polyphase mains, transformers having their primaries severally connected to the phases of said mains, a switch adapted to connect varying portions of the secondaries of different transformers in series, and an alternating-current machine having one of its members supplied from said mains and the other of its members supplied from the secondaries of said transformers.

In witness whereof we have hereunto set our hands this 21st day of October, 1903.

GABRIEL WINTER.
FRIEDRICH EICHBERG.
JOHANN ALEXANDER.

Witnesses as to Gabriel Winter:
ALVESTO S. HOGUE,
AUGUST FUGGER.

Witnesses as to Friedrich Eichberg and Johann Alexander:
HENRY HASPER,
WOLDEMAR HAUPT